US012070921B1

United States Patent
Drier et al.

(10) Patent No.: US 12,070,921 B1
(45) Date of Patent: Aug. 27, 2024

(54) BALER WITH INTERNAL SCALE

(71) Applicant: WM Intellectual Property Holdings, L.L.C., Houston, TX (US)

(72) Inventors: Christopher Drier, Saint Louis, MO (US); Charles Searles, Houston, TX (US); Dennis Craig Siegel, Pleasant, PA (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

(21) Appl. No.: 18/419,889

(22) Filed: Jan. 23, 2024

Related U.S. Application Data

(60) Provisional application No. 63/440,647, filed on Jan. 23, 2023.

(51) Int. Cl.
*B30B 9/30* (2006.01)
*B30B 15/00* (2006.01)
*G01G 19/52* (2006.01)

(52) U.S. Cl.
CPC ........ *B30B 9/3032* (2013.01); *B30B 15/0094* (2013.01); *G01G 19/52* (2013.01)

(58) Field of Classification Search
CPC ... B30B 15/0094; B30B 9/3032; B30B 15/26; G01G 19/52; G01G 19/00; A01F 2015/0891; B65B 13/20
USPC ...................................... 100/3, 99, 240, 245
See application file for complete search history.

(56) References Cited

U.S. PATENT DOCUMENTS

| | | |
|---|---|---|
| 3,934,394 A | 1/1976 | Garrison |
| 4,236,222 A | 11/1980 | Loshbough et al. |
| 4,362,097 A | 12/1982 | Rogers |
| 4,454,028 A | 6/1984 | Vetter et al. |
| 4,742,880 A | 5/1988 | Schrag et al. |
| 5,551,218 A | 9/1996 | Henderson et al. |

(Continued)

FOREIGN PATENT DOCUMENTS

| | | |
|---|---|---|
| CA | 3035602 | 3/2018 |
| GB | 2488996 | 9/2012 |

(Continued)

OTHER PUBLICATIONS

Canadian Intellectual Property Office; Examiner Report, issued in connection to application No. 3,035,602; Sep. 29, 2023; 4 pages; Canada.

(Continued)

*Primary Examiner* — Jimmy T Nguyen
(74) *Attorney, Agent, or Firm* — Greenberg Traurig LLP

(57) ABSTRACT

A system and method for weighing of recyclable materials inside an industrial baler is provided. The baler can have an internal baler scale for weighing of recyclable materials. The baler can include an internal chamber enclosed by a safety gate at its upper portion and a door at its lower portion. Recyclable material can be loaded into the internal chamber and compressed by the action of a piston and associated piston face. The lower portion of the interior chamber can have a floor comprising a plurality of individual raised sections. The baler scale can sit atop the individual raised sections. The baler scale can include one or more load cells positioned under a base and in the gap space between the baler scale and the individual raised sections of the floor.

7 Claims, 8 Drawing Sheets

(56) References Cited

U.S. PATENT DOCUMENTS

| | | |
|---|---|---|
| 6,021,712 A | 2/2000 | Harrop |
| 6,123,017 A | 9/2000 | Litle et al. |
| 6,138,557 A | 10/2000 | Brown et al. |
| 6,474,228 B1 | 11/2002 | Leupe et al. |
| 6,593,853 B1 | 7/2003 | Barrett et al. |
| 6,633,798 B2 | 10/2003 | Daniel et al. |
| 7,146,294 B1 | 12/2006 | Waitkus, Jr. |
| 7,406,402 B1 | 7/2008 | Waitkus, Jr. |
| 7,685,192 B1 | 3/2010 | Scofield et al. |
| 7,728,730 B2 | 6/2010 | Langlois et al. |
| 7,743,699 B1 | 6/2010 | Freeman et al. |
| 7,897,884 B2 * | 3/2011 | Harish .................. G01G 7/06 177/144 |
| 7,957,937 B2 | 6/2011 | Waitkus, Jr. |
| 8,046,192 B2 | 10/2011 | Mcclain et al. |
| 8,285,681 B2 | 10/2012 | Prahlad et al. |
| 8,362,903 B2 | 1/2013 | Lindh et al. |
| 8,371,214 B1 | 2/2013 | Correale et al. |
| 8,392,135 B2 | 3/2013 | Mcclain et al. |
| 10,021,859 B1 | 7/2018 | Miller |
| 10,377,518 B2 | 8/2019 | Waite et al. |
| 10,564,029 B2 | 2/2020 | Waite et al. |
| 11,123,939 B2 | 9/2021 | Chan et al. |
| 11,148,383 B2 | 10/2021 | Waite et al. |
| 11,162,834 B2 | 11/2021 | Waite et al. |
| 11,241,854 B2 | 2/2022 | Waite et al. |
| 11,571,869 B2 | 2/2023 | Chan et al. |
| 11,780,190 B2 | 10/2023 | Chan et al. |
| 11,850,818 B2 | 12/2023 | Chan et al. |
| 2002/0108507 A1 | 8/2002 | May et al. |
| 2003/0028289 A1 | 2/2003 | Daniel et al. |
| 2005/0065640 A1 | 3/2005 | Mallett et al. |
| 2005/0126958 A1 | 6/2005 | Bohlig et al. |
| 2005/0197175 A1 | 9/2005 | Anderson |
| 2005/0280537 A1 | 12/2005 | Feltz et al. |
| 2006/0080819 A1 | 4/2006 | Mcallister |
| 2007/0209530 A1 | 9/2007 | Maud |
| 2008/0197194 A1 | 8/2008 | Flood |
| 2010/0011717 A1 | 1/2010 | Rivard |
| 2010/0116881 A1 | 5/2010 | Flood et al. |
| 2010/0299097 A1 | 11/2010 | Threlkeld et al. |
| 2012/0029980 A1 | 2/2012 | Paz |
| 2012/0048129 A1 | 3/2012 | Smith et al. |
| 2012/0168354 A1 | 7/2012 | Sundholm |
| 2012/0204740 A1 | 8/2012 | Bergmann |
| 2012/0266763 A1 | 10/2012 | Foster et al. |
| 2013/0008324 A1 | 1/2013 | Verhaeghe et al. |
| 2014/0156541 A1 | 6/2014 | Waite et al. |
| 2014/0157999 A1 | 6/2014 | Verhaeghe et al. |
| 2015/0379785 A1 | 12/2015 | Brown, Jr. et al. |
| 2016/0014965 A1 | 1/2016 | Naeyaert et al. |
| 2016/0023417 A1 | 1/2016 | Hanson et al. |
| 2016/0081276 A1 | 3/2016 | Riesterer et al. |
| 2016/0088798 A1 | 3/2016 | Lang et al. |
| 2016/0187185 A1 | 6/2016 | Smith |
| 2017/0008671 A1 | 1/2017 | Whitman et al. |
| 2017/0014868 A1 | 1/2017 | Garcia, Jr. et al. |
| 2017/0200135 A1 | 7/2017 | Whitman et al. |
| 2017/0202150 A1 | 7/2017 | Smith |
| 2017/0211969 A1 | 7/2017 | Waite et al. |
| 2017/0225199 A1 | 8/2017 | Koistinen et al. |
| 2018/0056617 A1 | 3/2018 | Chan et al. |
| 2018/0056618 A1 | 3/2018 | Chan et al. |
| 2019/0148797 A1 | 5/2019 | Paszti |
| 2019/0217342 A1 | 7/2019 | Parr et al. |
| 2019/0224935 A1 | 7/2019 | Waite et al. |
| 2019/0293478 A1 | 9/2019 | Waite et al. |
| 2019/0304236 A1 | 10/2019 | Chan et al. |
| 2020/0010271 A1 | 1/2020 | Bourn et al. |
| 2020/0164608 A1 | 5/2020 | Waite et al. |
| 2020/0222949 A1 | 7/2020 | Murad et al. |
| 2021/0170707 A1 | 6/2021 | Chan et al. |
| 2022/0055071 A1 | 2/2022 | Sharma et al. |
| 2022/0168898 A1 | 6/2022 | Satat |
| 2022/0180501 A1 | 6/2022 | Perez |
| 2022/0184855 A1 | 6/2022 | Mleczko et al. |
| 2023/0286239 A1 | 9/2023 | Chan et al. |
| 2024/0034019 A1 | 2/2024 | Chan et al. |
| 2024/0075702 A1 | 3/2024 | Chan et al. |

FOREIGN PATENT DOCUMENTS

| | | |
|---|---|---|
| WO | 1999/037474 | 7/1999 |
| WO | 03/031167 | 4/2003 |
| WO | 2018/057126 | 3/2018 |
| WO | 2018/044498 | 8/2018 |
| WO | 2019/195257 | 10/2019 |

OTHER PUBLICATIONS

International Search Report and Written Opinion, issued in connection to application No. PCT/US2017/045315, Oct. 30, 2017.

Mexican Institute of Industrial Property; Office Action, issued in connection to application No. MX/a/2019/002485; 4 pages; Aug. 25, 2023; Mexico.

Mexican Institute of Industrial Property; Office Action, issued in connection to application No. MX/a/2019/002485; 4 pages; Nov. 27, 2019; Mexico.

Mexican Institute of Industrial Property; Office Action, issued in connection to application No. MX/a/2019/002485; 5 pages; Apr. 30, 2019; Mexico.

The International Bureau of WIPO; PCT International Preliminary Report on Patentability, issued in connection to application PCT/US2017/045278; Mar. 5, 2019; 9 pages; Switzerland.

The International Bureau of WIPO; PCT International Preliminary Report on Patentability, issued in connection with application No. PCT/US2019/025345; 8 pages; Switzerland.

United States Patent and Trademark Office; PCT International Search Report, issued in connection to application PCT/US2017/045278; Nov. 2, 2017; 3 pages; US.

United States Patent and Trademark Office; PCT International Search Report, issued in connection with application No. PCT/US2019/025345; Jul. 22, 2019; 4 pages; US.

United States Patent and Trademark Office; PCT Written Opinion of the International Searching Authority, issued in connection to application PCT/US2017/045278; Nov. 2, 2017; 8 pages; US.

United States Patent and Trademark Office; PCT Written Opinion of the International Searching Authority, issued in connection with application No. PCT/US2019/025345; Jul. 22, 2019; 7 pages; US.

Canadian Intellectual Property Office; Office Action, issued in connection to application No. 3035600, Mar. 13, 2024; 3 pages; Canada.

* cited by examiner

BALER WITH INTERNAL SCALE

RELATED APPLICATIONS

This application claims the benefit, and priority benefit, of U.S. Provisional Patent Application Ser. No. 63/440,647, filed Jan. 23, 2023, the disclosure and contents of which are incorporated by reference herein in their entirety.

BACKGROUND

Retail stores and other similar businesses collect and generate large amounts of potentially recyclable materials. For example, a retail store may initially receive and stock its inventory of goods in cardboard boxes. Goods may also be initially packaged using polystyrene, polyethylene, polypropylene, paper products, cloth, foam, film, bottles, glass, metal or other recyclable materials.

It is desirable for these businesses to be able to recycle these packaging materials quickly and efficiently. Moreover, these businesses may also want to measure and account for the total quantity of recyclable material that is collected.

It is known in the art to use industrial balers to compress recyclable materials for processing. It is also known in the art to use externally-located scales to measure the weight of the bales of recyclable materials that are produced by the balers. However, these previous scales have been inefficient and inconveniently located, among other disadvantages.

Improvements in this field of technology are therefore desired.

SUMMARY

The following presents a simplified summary of the disclosed subject matter in order to provide a basic understanding of some aspects thereof. This summary is not an exhaustive overview of the technology disclosed herein.

In certain illustrative embodiments, a baler for compressing recyclable materials is provided. The baler can include an internal chamber having a volume defined by a front door, a rear wall, a pair of side walls, a floor comprising a plurality of individual raised sections and a plurality of floor gaps at spaced-apart intervals between the individual raised sections, and a piston face moveable by a piston and configured to compress the recyclable materials within the internal chamber to form a bale, and a baler scale comprising a base and one or more load cells, wherein the baler scale is configured to sit atop the floor and within the internal chamber, and wherein the one or more load cells are disposed beneath the base and the individual raised sections, and wherein the one or more load cells are configured to measure a weight of the recyclable materials when the recyclable materials rest atop the base.

In some aspects, the one or more load cells can be operatively connected to a computer panel and a display screen to communicate data regarding the weight of the materials being baled. The base can be modular and include a plurality of smaller segments that fit together to form a whole. The baler scale can include a rectangularly shaped base and the load cells can be located at the four corners of the rectangular shaped base. The base can have a plurality of elongated grooves formed therein, and the grooves can be aligned in a parallel orientation with one another and correspond to the location of the floor gaps between one of the individually raised sections on the floor of the baler. The baler scale can sit atop one of the individually raised sections on the floor inside the baler and the grooves can align with and sit within the floor gaps. A baling wire can be positioned under the bale of compressed material and sit within the grooves. A plurality of baler scales can sit atop the floor and within the internal chamber.

BRIEF DESCRIPTION OF THE DRAWINGS

A better understanding of the presently disclosed subject matter can be obtained when the following detailed description is considered in conjunction with the drawings and figures herein, wherein.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter relates to a system and method for weighing of recyclable materials inside an industrial baler. Illustrative embodiments of the presently disclosed system and method are shown in FIGS. 1-9 herein.

Figure 1:
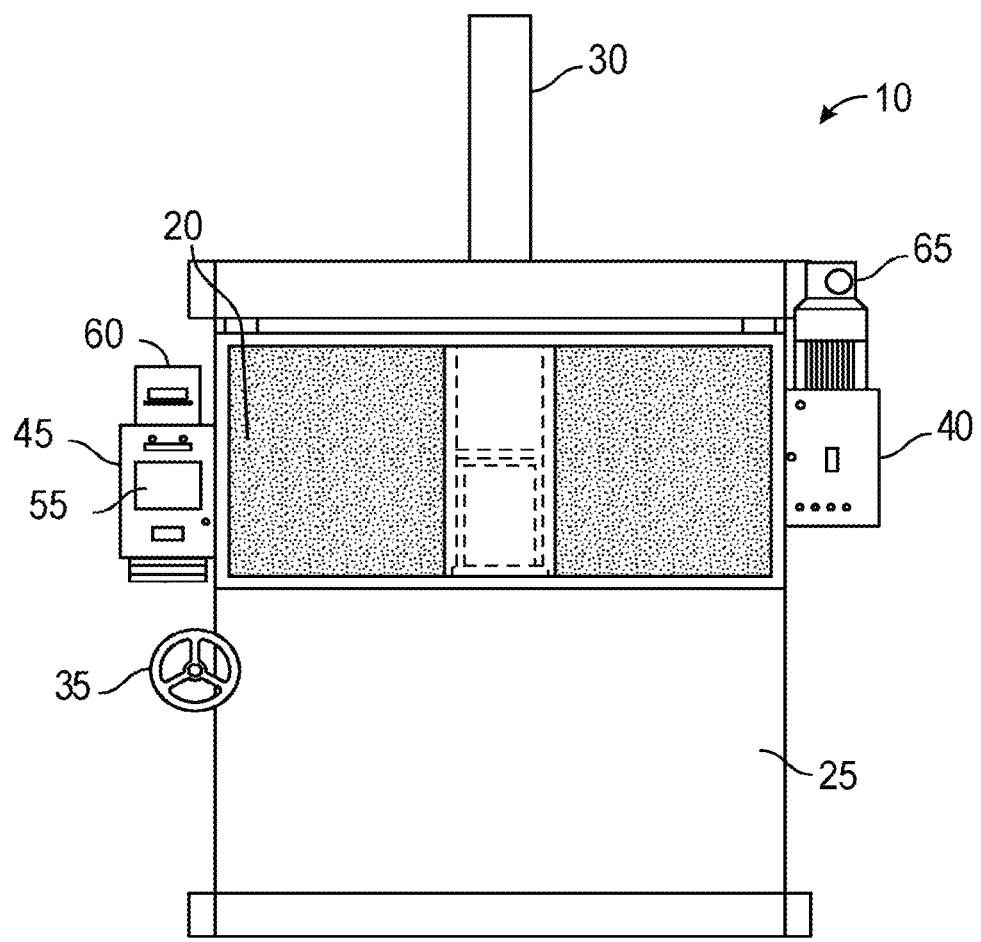
FIG. 1 is a front view of a baler in accordance with an illustrative embodiment of the presently disclosed subject matter.

In certain illustrative embodiments, the presently disclosed system and method utilize a baler 10 with an internal baler scale 85 for weighing of recyclable materials. As shown in FIG. 1, baler 10 can include an internal chamber enclosed by a safety gate 20 at its upper portion and a door 25 at its lower portion. Recyclable material can be loaded into the internal chamber and compressed by the action of a piston 30 and associated piston face 31. A door lock wheel 35 can be used with door 25 as a safety mechanism which requires door 25 to be locked during baling operations. Baler 10 can be controlled by a non-automated control panel 40 which controls functions such as, e.g., piston controls, power, panel door lock, etc. Baler 10 can also include a separate or integrated automated or "smart" control panel 45 which may house a computer processor 50 (not shown) which may be operably connected to various equipment such as a display screen 55, a printer 60, an imaging device 65 such as a camera, as well as other sensors and/or baler controls, etc.

Figure 2:
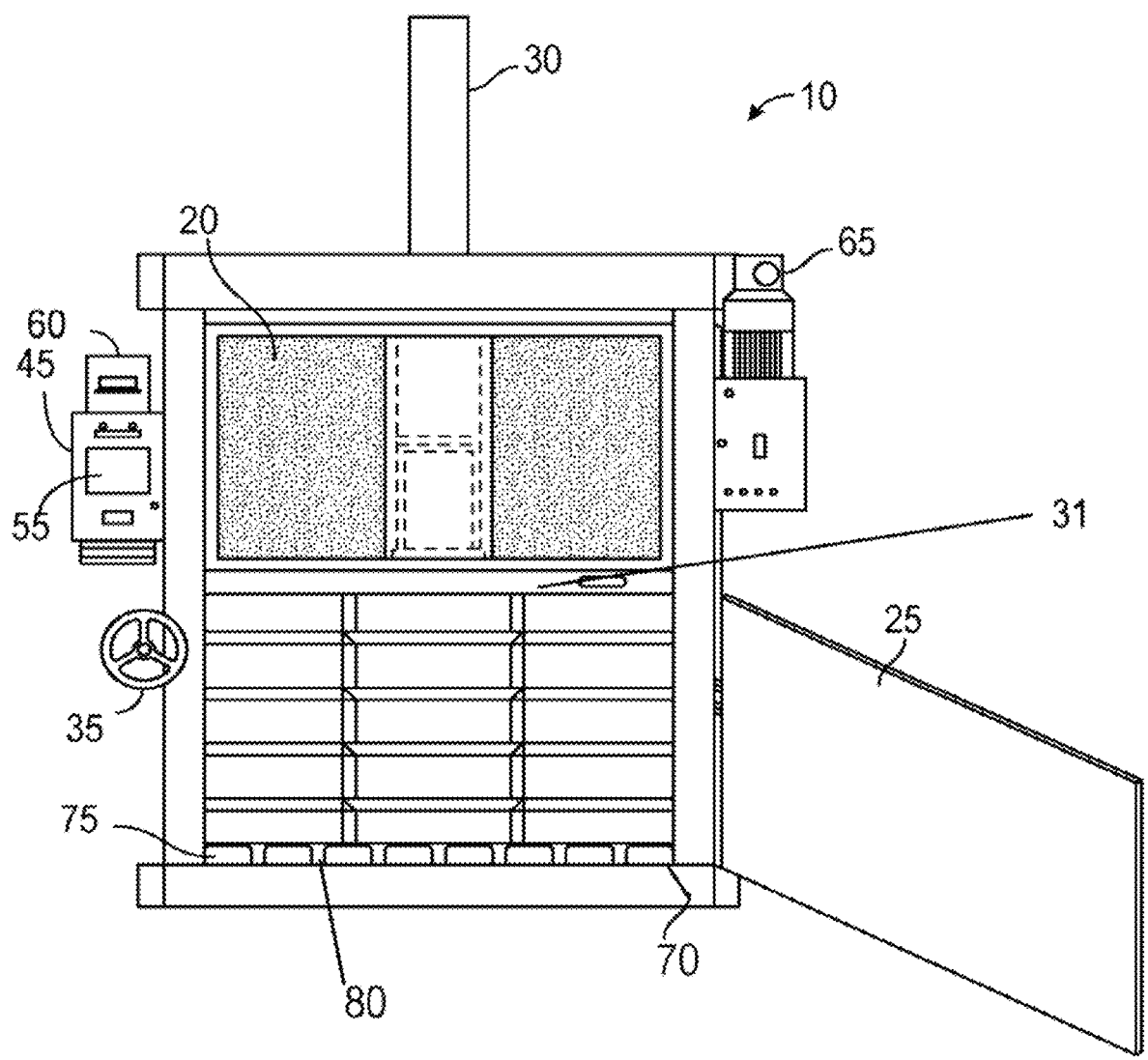
FIG. 2 is a front view of a baler with the door in an open position in accordance with an illustrative embodiment of the presently disclosed subject matter.
Figure 3:
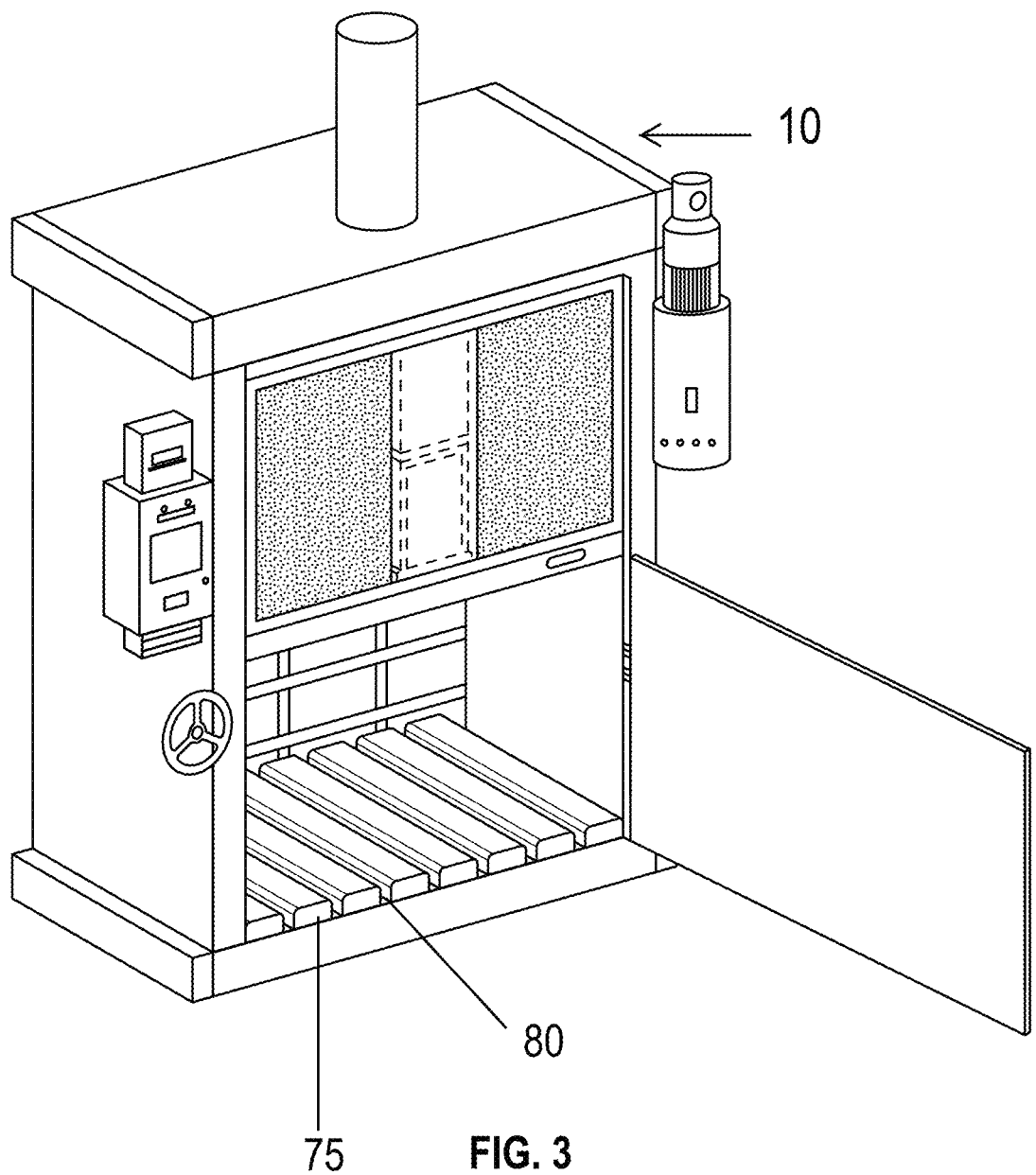
FIG. 3 is a perspective view of a baler with the door in an open position in accordance with an illustrative embodiment of the presently disclosed subject matter.

As shown in FIG. 2 (front view) and FIG. 3 (perspective view), the door 25 of baler 10 can swing out to an open position. The lower portion of the interior chamber of baler 10 can have a floor 70 comprising a plurality of individual raised sections 75 and a plurality of floor gaps 80 at spaced-apart intervals between the individual raised sections 75. Floor gaps 80 facilitate the insertion of baling wire under the bale of compressed material so that the bale can be tied and completed.

Figure 4:
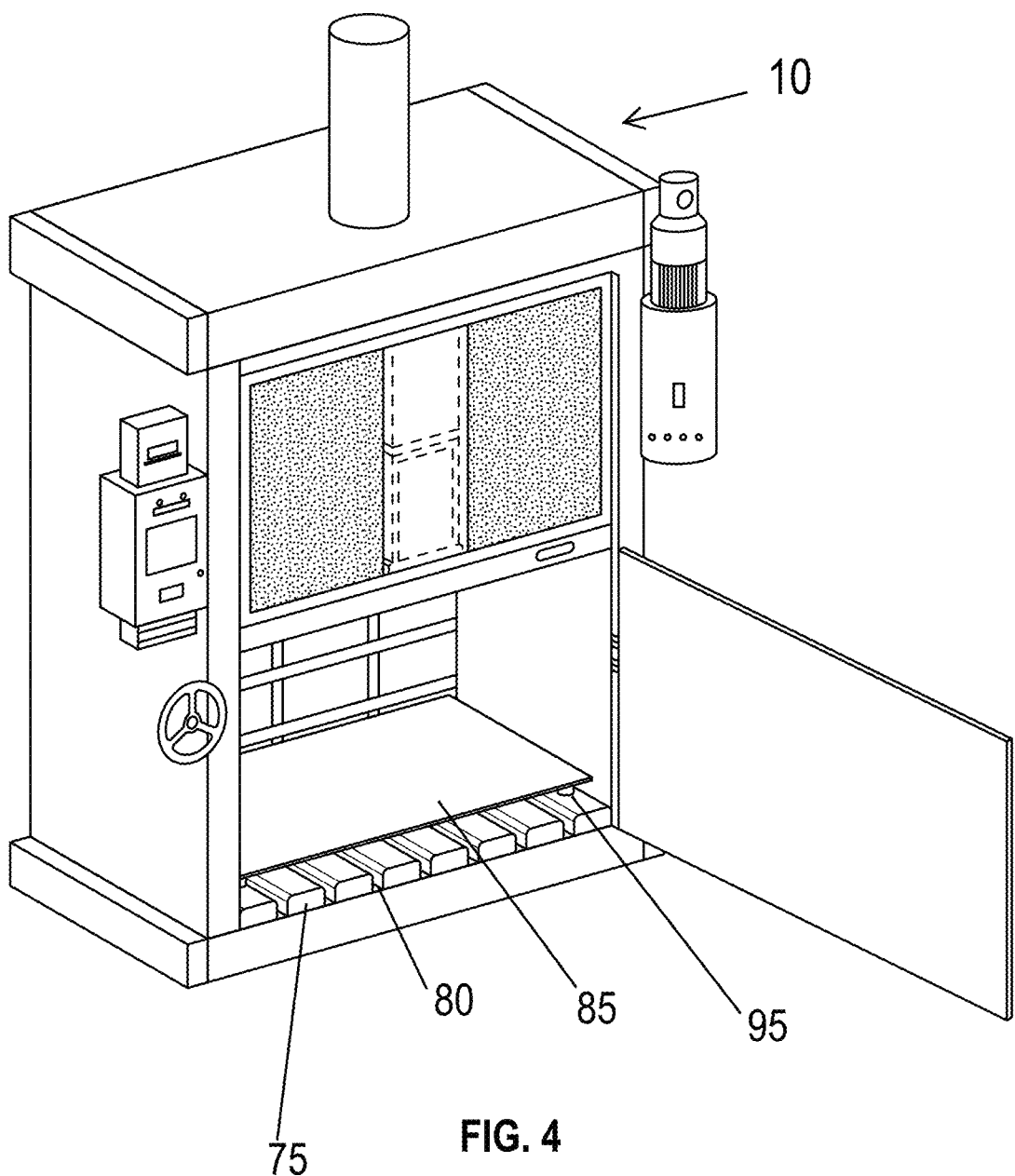
FIG. 4 is a perspective view of a baler with the door in an open position and a baler scale located inside the baler on the baler floor in accordance with an illustrative embodiment of the presently disclosed subject matter.
Figure 5:
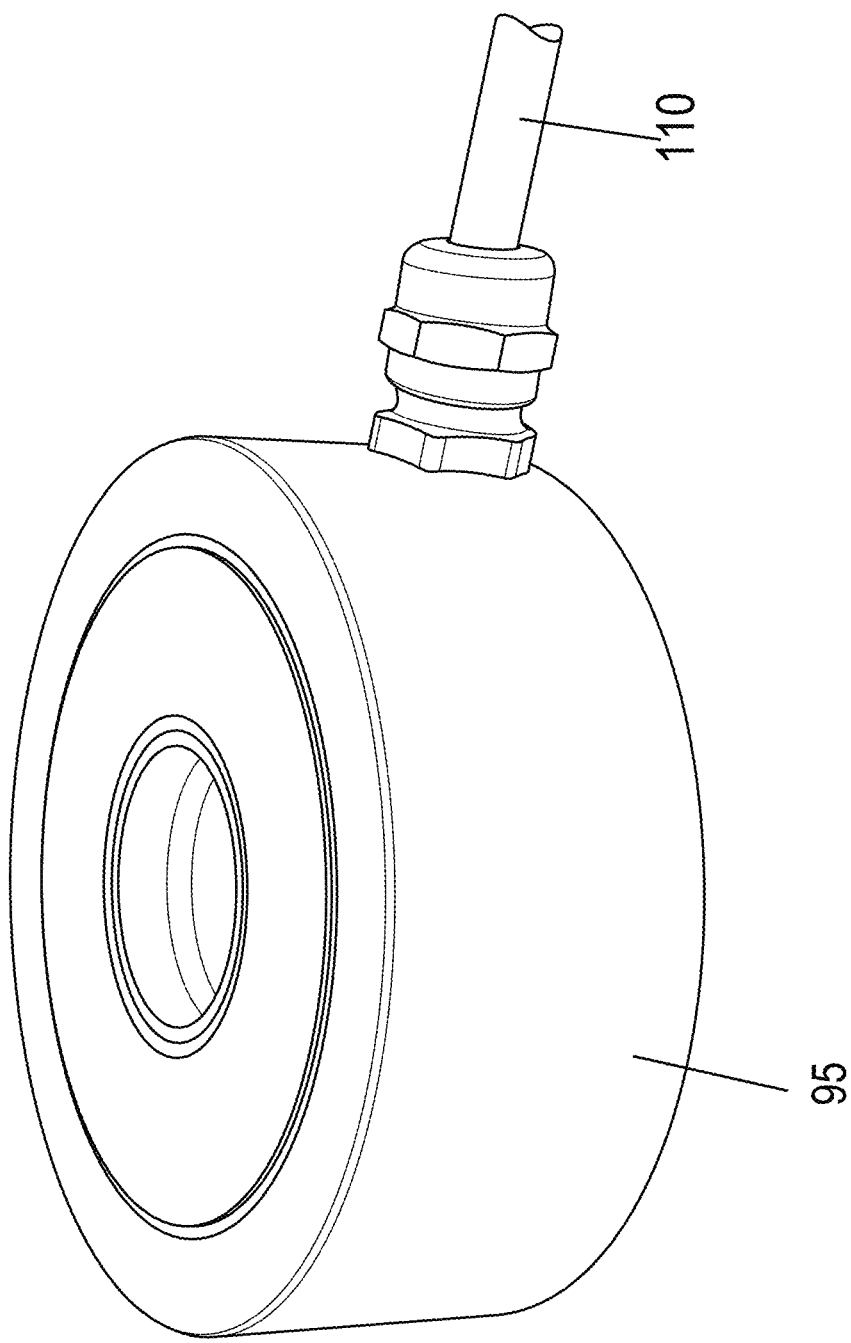
FIG. 5 is a perspective view of a load cell in accordance with an illustrative embodiment of the presently disclosed subject matter.

As shown in FIG. 4, a baler scale 85 can sit atop the individual raised sections 75 of floor 35 inside of baler 10. Baler scale 85 can include a generally flat-shaped base 90 (see FIG. 6) and one or more load cells 95 positioned under base 90 and in the gap space between the baler scale 85 and the individual raised sections 75 of floor 70. Load cells can be affixed to base 90 or detachable therefrom. Baler scale 85 can be used to weigh the recyclable materials collected in baler 10. Load cells 95 are force transducers that can convert force such as weight, compression, or pressure, into an electrical signal that can be measured and standardized. As the force applied to load cell 95 increases, the electrical signal can change proportionally. An illustration of a load cell 95 is shown in FIG. 5. Load cell 95 can be pneumatic, hydraulic, or the like. A representative example of a load cell 95 that can be utilized with baler 10 is the RLC ring torsion load cell sold by Mettler-Toledo of Columbus, Ohio.

In certain illustrative embodiments, load cell 95 can have wiring 110 or other means of connectivity (e.g., wireless) with smart control panel 45, computer processor 50 and display screen 55 of baler 10 to deliver an electric or other signal and communicate data as well as facilitate viewing of the current weight of the material being baled, minimum weight, maximum weight, etc. . . . . Moreover, load cells 95 can have on/off functionality, so that they can weigh recyclable material and/or communicate results to smart control panel 45 only when desired, such as, for example, only after the bale has been compressed and formed, and not during compression, or alternatively, load cells 95 can have continuous weighing functionality at all times including before, during and after compression.

Figure 6A:
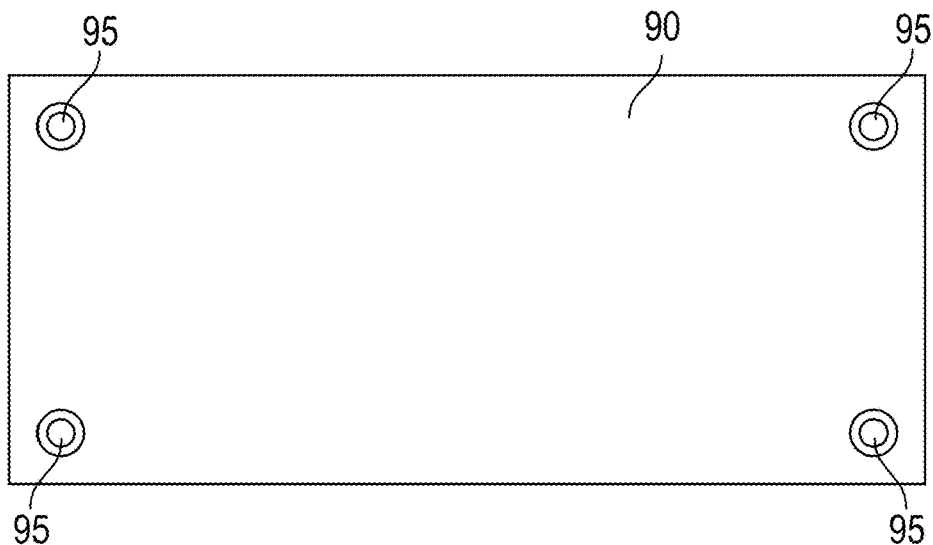
FIG. 6A is a bottom view of a baler scale with four load cells in accordance with an illustrative embodiment of the presently disclosed subject matter.
Figure 6B:
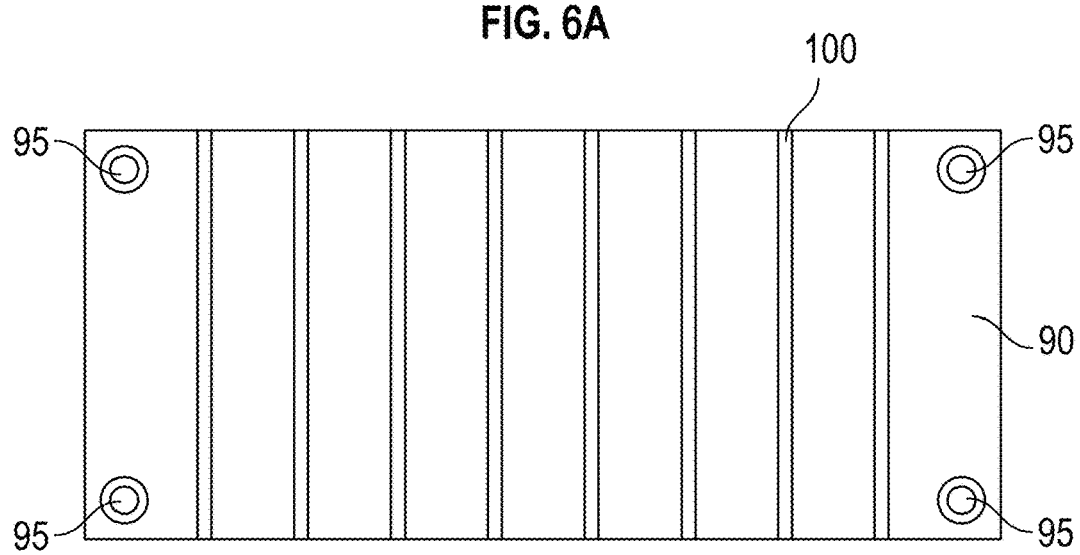
FIG. 6B is a bottom view of a baler scale with four load cells and a plurality of grooves formed therein in accordance with an illustrative embodiment of the presently disclosed subject matter.
Figure 6C:
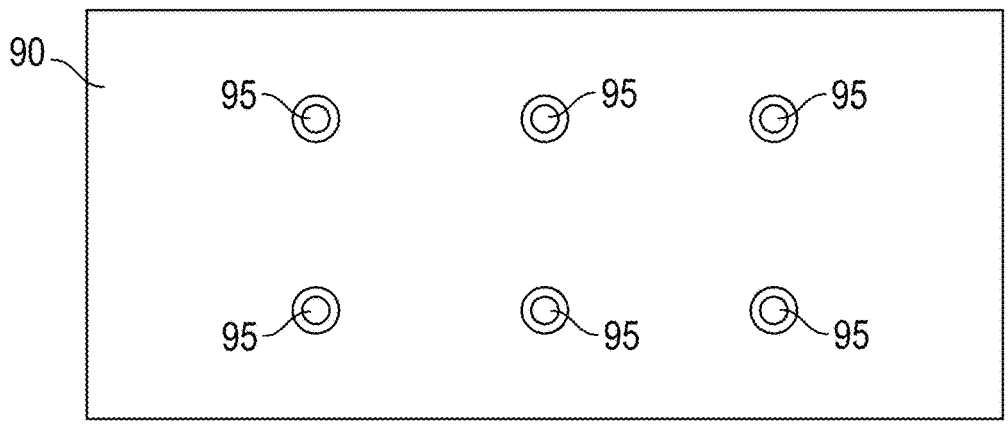
FIG. 6C is a bottom view of a baler scale with six load cells in accordance with an illustrative embodiment of the presently disclosed subject matter.

As shown in FIG. 6A, FIG. 6B and FIG. 6C, base 90 of baler scale 85 can have a variety of different shapes and configurations. For example, base 90 can have a rectangular shape which generally corresponds to the shape of floor 70 inside baler 10 to ensure a secure fit. Base 90 can also have other shapes or configurations, as desired. For example, base 90 can be modular, and can comprise a plurality of different smaller segments that fit together to form a whole, or the smaller segments can be utilized independently or in groups of two, three, four or more to cover certain areas of floor 70. The modular design for base 90 can facilitate ease of installation for baler scale 85 on floor 70.

In certain illustrative embodiments, one or more load cells 95 can be positioned in a variety of different locations under base 90. For example, in FIG. 6A and FIG. 6B, load cells 95 are located at or near the four corners of rectangular-shaped base 90. In FIG. 6C, load cells 95 are located at or near the middle of rectangular-shaped base 90.

Moreover, the number of load cells 95 can vary. In FIG. 6A and FIG. 6B, four (4) load cells 95 are used, whereas in FIG. 6C, six (6) load cells 95 are used. The number and location of load cells 95 under base 90 can be moved, adjusted or rearranged as needed in order to effectively measure and determine the weight of the recyclable materials that sit atop baler scale 85.

In certain illustrative embodiments, such as shown in FIG. 6B, base 90 can have a plurality of elongated grooves 100 formed therein. Grooves 100 can be aligned in a parallel orientation with one another, and can correspond to the location of the floor gaps 80 between the raised section 75 on floor 70 of baler 10.

Figure 7:
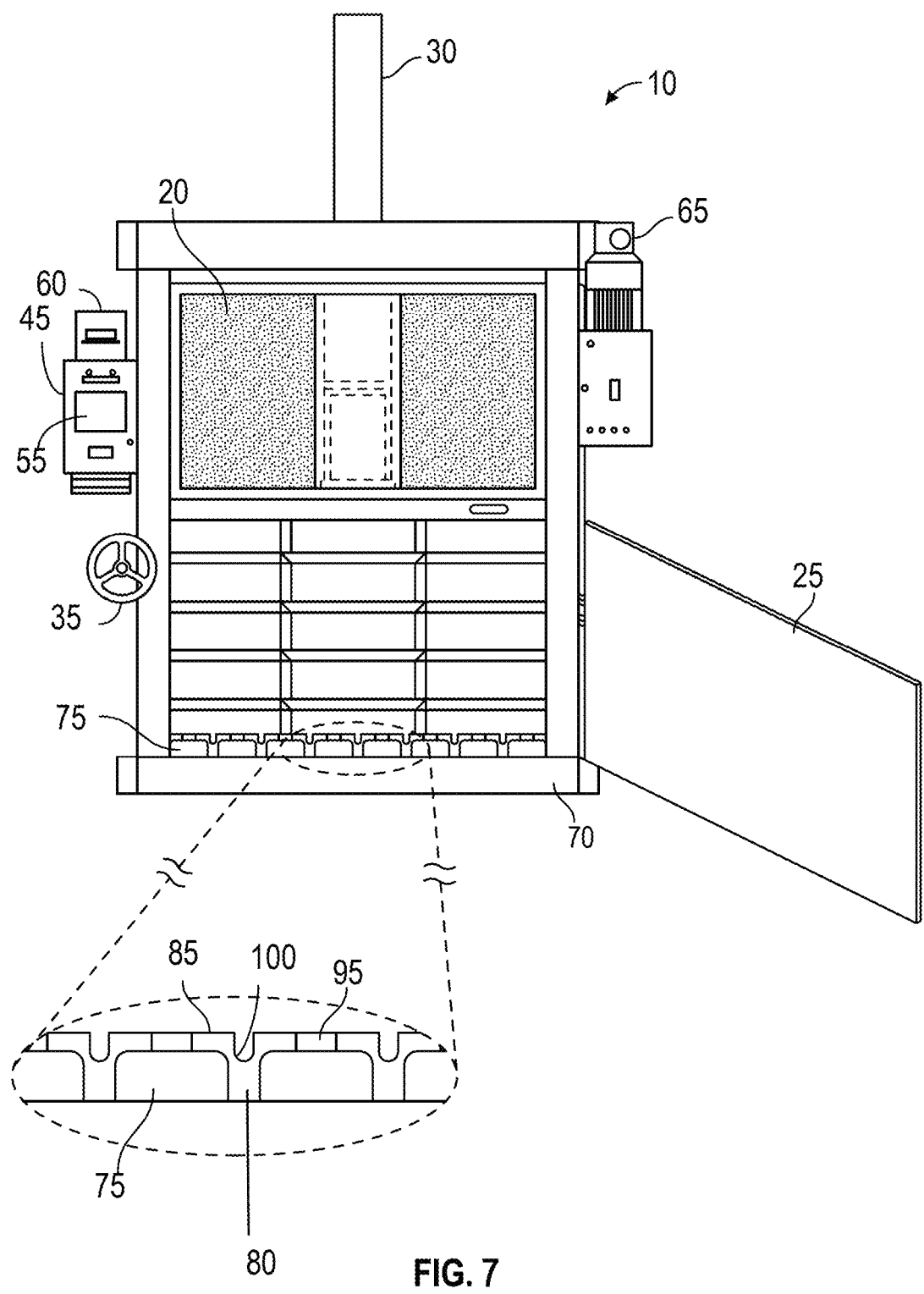
FIG. 7 is a front view of a baler with the door in an open position and a baler scale located inside the baler on the baler floor in accordance with an illustrative embodiment of the presently disclosed subject matter.

Thus, as shown in FIG. 7, when baler scale 85 with load cells 95 sits atop the raised section 75 on floor 70 inside of baler 10, grooves 100 align with, and sit within, floor gaps 80, and the baling wire under the bale of compressed material can sit within grooves 100 instead of within floor gaps 80, and remain relatively unobstructed.

In certain illustrative embodiments, baler 10 for compressing recyclable materials can include an internal chamber having a volume defined by a front door 25, a rear wall, a pair of side walls, a floor 70 comprising a plurality of individual raised sections 75 and a plurality of floor gaps 80 at spaced-apart intervals between the individual raised sections 75, and a piston face 31 moveable by a piston 30 and configured to compress the recyclable materials within the internal chamber to form a bale, and a baler scale 85 comprising a base 90 and one or more load cells 95, wherein the baler scale 85 is configured to sit atop the floor 70 and within the internal chamber, and wherein the one or more load cells 95 are disposed beneath the base 90 and the individual raised sections 75, and wherein the one or more load cells 95 are configured to measure a weight of the recyclable materials when the recyclable materials rest atop the base 90.

Figure 8:
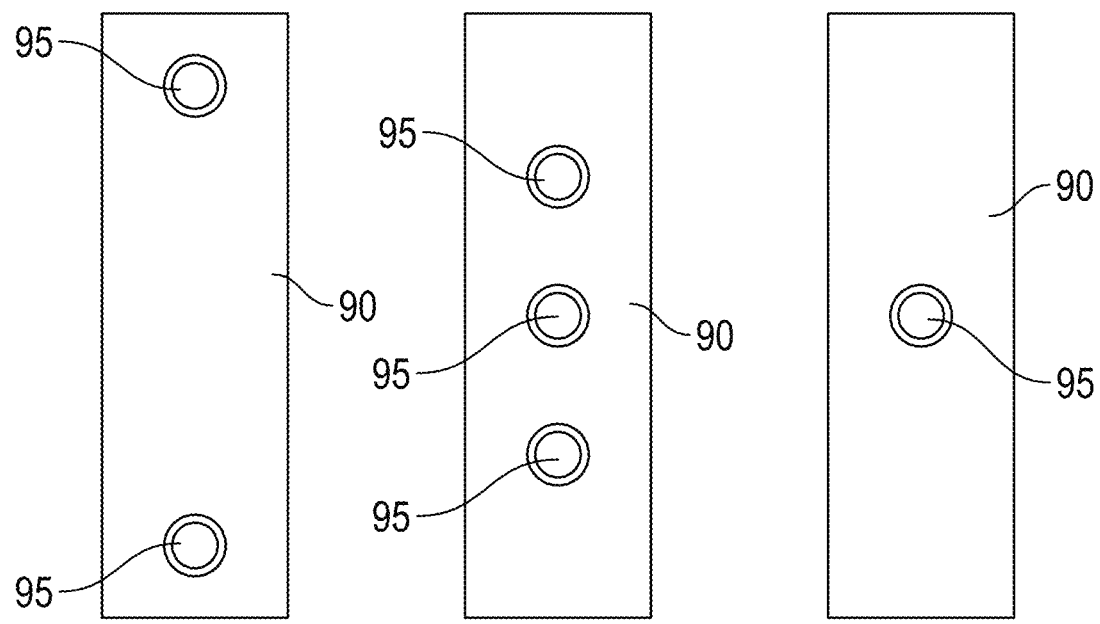
FIG. 8 is a bottom view of three elongated baler scales with two load cells, three load cells and one load cell, respectively, in accordance with illustrative embodiments of the presently disclosed subject matter.
Figure 9:
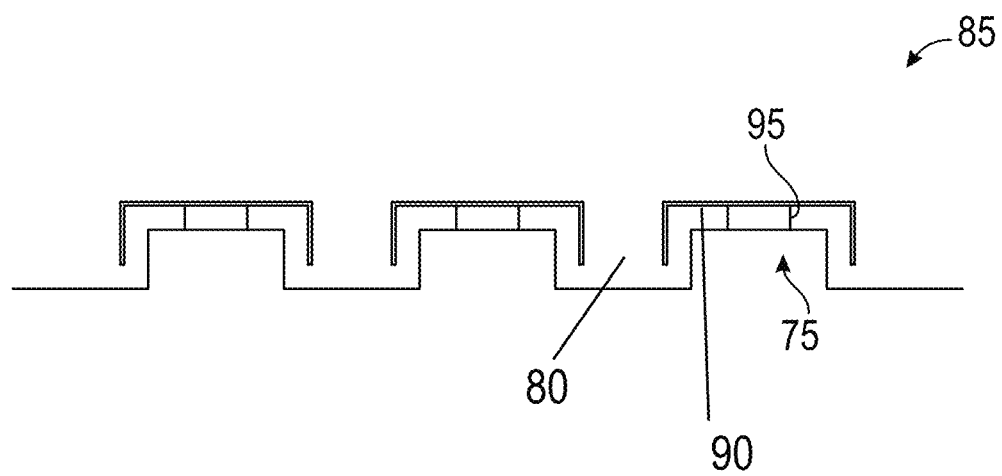
FIG. 9 is a side view of a baler floor with elongated baler scales positioned atop the individual raised sections of the baler floor in accordance with an illustrative embodiment of the presently disclosed subject matter.

In certain illustrative embodiments, base 90 can be shaped such that more than one baler scale 85 can be used inside baler 10 concurrently. For example, as shown in FIG. 8 and FIG. 9, base 90 can have a narrow, elongated center section with a pair of raised walls forming an inverted U-shape. One or more load cells 95 can be positioned in various locations along the center section of base 90, on the side of base 90 having the pair of raised walls. This shape of base 90 will generally correspond to the shape of a single raised section 75 on floor 70 of baler 10. Thus, as shown in FIG. 9, each raised section 75 can have its own baler scale 85 sitting thereon. In the embodiment shown in FIG. 8 and FIG. 9, floor gaps 80 are not fully covered by baler scale 85 and remain partially exposed. In other illustrative embodiments (not shown), two or more adjacent raised sections 75 can be covered by a single baler scale 85 having a widened (but still narrow), elongated center section, or non-adjacent raised sections 75 can each be covered by their own separate baler scale 85. The number and location of baler scales 85 can be adjusted or arranged as needed in order to effectively measure and determine the weight of the recyclable materials within baler 10.

In certain illustrative embodiments, baler 10 can include additional features such as described in U.S. Pat. Publication No. 2021/0170707 titled "Smart Baler", published Jun. 10, 2021, and U.S. Pat. Publication No. 2019/0304236 titled "System And Method For Handling Recyclable Materials", published Oct. 3, 2019, the contents and disclosure of each of which are incorporated by reference herein in their entirety.

The presently disclosed system and method has a number of advantages over existing designs. For example, a baler with an internally disposed baler scale according to the illustrative embodiments described herein is accurate, efficient and reduces safety concerns for users. The baler scale is also conveniently located and easy to install and/or remove.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims associated with this or any related application.

What is claimed is:

1. A baler for compressing recyclable materials, comprising:
    an internal chamber having a volume defined by a front door, a rear wall, a pair of side walls, a floor comprising a plurality of individual raised sections and a plurality of floor gaps at spaced-apart intervals between the individual raised sections to facilitate an insertion of a baling wire, and a piston face moveable by a piston and configured to compress the recyclable materials within the internal chamber to form a bale; and
    a baler scale comprising a base and one or more load cells, wherein the baler scale is configured to sit atop the floor and within the internal chamber, wherein the one or more load cells are disposed beneath the base and above the individual raised sections, wherein the one or more load cells are configured to measure a weight of the recyclable materials when the recyclable materials rest atop the base, wherein the base has a plurality of elongated grooves formed therein, and wherein the grooves are aligned in a parallel orientation with one another and correspond to a location of the floor gaps between one of the individually raised sections on the floor of the baler.

2. The baler of claim 1, wherein the one or more load cells are operatively connected to a computer panel and a display screen to communicate data regarding the weight of the materials being baled.

3. The baler of claim 1, wherein the base is modular and comprises a plurality of smaller segments that fit together to form a whole.

4. The baler of claim 1, wherein the base is a rectangularly shaped base and the load cells are located at the four corners of the rectangular shaped base.

5. The baler of claim 1, wherein the baler scale sits atop one of the individually raised sections on the floor inside the baler and the grooves align with and sit within the floor gaps.

6. The baler of claim 5, wherein the baling wire under the bale of compressed material sits within the grooves.

7. The baler of claim 1, wherein a plurality of load cells sit atop the floor and within the internal chamber.

* * * * *